US009821225B2

(12) United States Patent
Asami et al.

(10) Patent No.: US 9,821,225 B2
(45) Date of Patent: Nov. 21, 2017

(54) GAME MACHINE, CONTROL METHOD USED IN SAME, AND NON-TRANSITORY COMPUTER READABLE STORAGE MEDIUM

(71) Applicant: Konami Digital Entertainment Co., Ltd., Minato-ku, Tokyo (JP)

(72) Inventors: Yuichi Asami, Minato-ku (JP); Hayana Honda, Minato-ku (JP); Shuhei Arai, Minato-ku (JP); Yohei Takahashi, Minato-ku (JP); Yoshiko Ichijo, Minato-ku (JP)

(73) Assignee: KONAMI DIGITAL ENTERTAINMENT CO., LTD., Minato-Ku, Tokyo (JP)

( * ) Notice: Subject to any disclaimer, the term of this patent is extended or adjusted under 35 U.S.C. 154(b) by 202 days.

(21) Appl. No.: 14/606,883

(22) Filed: Jan. 27, 2015

(65) Prior Publication Data

US 2015/0141102 A1 May 21, 2015

Related U.S. Application Data

(63) Continuation of application No. PCT/JP2013/072318, filed on Aug. 21, 2013.

(30) Foreign Application Priority Data

Aug. 21, 2012 (JP) .................. 2012-182333

(51) Int. Cl.
*A63F 13/814* (2014.01)
*A63F 13/45* (2014.01)
(Continued)

(52) U.S. Cl.
CPC ............ *A63F 13/45* (2014.09); *A63F 13/245* (2014.09); *A63F 13/44* (2014.09); *A63F 13/46* (2014.09);
(Continued)

(58) Field of Classification Search
CPC .......... A63F 13/06; A63F 13/10; A63F 13/44; A63F 13/45; A63F 13/814;
(Continued)

(56) References Cited

U.S. PATENT DOCUMENTS 6,225,547 B1   5/2001   Toyama et al.
6,390,923 B1 * 5/2002   Yoshitomi ............... A63F 13/00
                                                    434/307 R
(Continued)

FOREIGN PATENT DOCUMENTS

CN   102470276 A   5/2012
JP   2001-96061 A   4/2001
(Continued)

OTHER PUBLICATIONS

Guitar Freaks XG Dr um Mania XG, GEKK AN ARCADIA, vol. 11 No. 4 Arcade Vide O Game Machine Magazine Arcadia, from p. 068 to p. 071 (Cited in Japanese Office Action re Appln. No. 2012-182333); dated May 7, 2015.
(Continued)

*Primary Examiner* — Jasson Yoo
(74) *Attorney, Agent, or Firm* — Howard & Howard Attorneys PLLC

(57) ABSTRACT

Provided is a game machine that can expand the range of play actions demanded of a player. The game machine is provided with an input apparatus including four play operation units, and provides a music game that demands of the player a predetermined operation of each play operation unit. The game machine is provided with: a vibration sensor that detects a predetermined operation of each play operation unit; and an optical sensor that detects player actions during play of the music game. Also, the game machine evaluates the predetermined operation of the player on the basis of the detection results of the vibration sensor and evaluates player actions that are correlated with the predetermined operation on the basis of the detection results of the optical sensor.

8 Claims, 7 Drawing Sheets

(51) Int. Cl.
*A63F 13/245* (2014.01)
*A63F 13/5375* (2014.01)
*A63F 13/46* (2014.01)
*A63F 13/44* (2014.01)
*A63F 13/213* (2014.01)
*A63F 13/214* (2014.01)

(52) U.S. Cl.
CPC ........ *A63F 13/5375* (2014.09); *A63F 13/213* (2014.09); *A63F 13/214* (2014.09); *A63F 13/814* (2014.09)

(58) Field of Classification Search
CPC ...... A63F 2300/1043; A63F 2300/1087; A63F 2300/8047; A63F 13/213; A63F 13/214; A63F 13/245; A63F 13/46; A63F 13/5375
See application file for complete search history.

(56) References Cited

U.S. PATENT DOCUMENTS

2010/0248836 A1* 9/2010 Suzuki ................... A63F 13/02
463/36
2011/0028214 A1* 2/2011 Bright .................... A63F 13/10
463/35
2012/0135806 A1* 5/2012 Nakano ................. G10H 1/342
463/36

FOREIGN PATENT DOCUMENTS

| | | |
|---|---|---|
| JP | 2001-129244 A | 5/2001 |
| JP | 2011-36293 A | 2/2011 |
| JP | 2011-147594 A | 8/2011 |
| JP | 2012-95884 A | 5/2012 |
| KR | 1020010085665 | 9/2001 |

OTHER PUBLICATIONS

Wikipedia, [online], [EZ2Dancer], URL: https://ko.wikipedia.org/w/index.php?title=%EC%9D%B4%EC%A7%80%ED%88%AC%EB%8C%84%EC%84%9C&oldid=8458482, Mar. 26, 2012, [Jun. 14, 2016 search].

YouTube [online], Manny-ZX [MaNnY. Make Love (EZ2Dancer 2nd Move)] URL: https:www.youtube.com/watch?v=THrj27HPyUk, Apr. 7, 2010. [Jun. 14, 2010 search].

International Search Report (PCT/JP2013/072318); dated Nov. 19, 2013.

Notification to Grant Patent Right for Invention (CN Patent Appln. No. 201380044003.9); dated May 17, 2017; 3 pages; English Translation included.

* cited by examiner

GAME MACHINE, CONTROL METHOD USED IN SAME, AND NON-TRANSITORY COMPUTER READABLE STORAGE MEDIUM

CROSS-REFERENCE TO RELATED APPLICATION

This application is a continuation of PCT Application No. PCT/JP2013/072318, filed Aug. 21, 2013, which claims priority to Japanese Patent Application No. 2012-182333, filed Aug. 21, 2012, the disclosures of which are hereby incorporated by reference in their entirety.

TECHNICAL FIELD

The present invention relates to a game machine or the like that comprises an input apparatus including an operation unit, and that provides a game that demands predetermined operations on the operation unit from a player.

BACKGROUND ART

There are known games that demand predetermined operations on the operation unit of an input apparatus from a player. As one such game, a music game is per se known (for example, refer to Patent Document #1) in which a notes bar is displayed along a predetermined path in correspondence to rhythmic music, and in which, moreover, guidance as to operational timings is provided by shifting the notes bar towards a reference line so that this notes bar agrees in operational timing with the reference line.

CITATION LIST

Patent Literature

Patent Document #1: Japanese Laid Open Patent Publication 2001 96061.

SUMMARY OF INVENTION

Technical Problem

With a music game like that of Patent Document #1, a sham guitar is employed as an input apparatus. And operations performed with a pick upon this sham guitar are evaluated as the playing actions. With this type of music game, the more that the input apparatus is used for performing as with a real musical instrument, the more the presence is enhanced. Accordingly if, for example, a sham guitar is used with similar gestures or with similar action to a performance with a real guitar, then it is easy to attract the attention of people nearby. Moreover, it is also often the case that their evaluation of the game is heightened. Due to this, as operations upon the input apparatus or upon its operation unit, use similar to a performance of a musical instrument is desirable. However, with the game apparatus of Patent Document #1, the gestures and so on during operation of the sham guitar are not subjects of evaluation. In other words, the demands upon the player do not extend to using the sham guitar as though an actual guitar was being played. Due to this, it is not always true that the input apparatus or the like is necessarily used with desirable gestures or the like.

Accordingly, the object of the present invention is to provide a game machine and so on, capable of expanding the range of playing actions that are demanded from the player.

Solution to Technical Problem

A game machine of the present invention is of a game machine comprising an input apparatus that includes at least an operation unit, and providing a game that demands a predetermined operation on the operation unit from a player, and wherein the game machine comprises: an operation detection device configured to detect the predetermined operation upon the operation unit; a state detection device configured to detect the state of the player who is playing the game; an operation evaluation device configured to evaluate the predetermined operation by the player on the basis of the result of detection by the operation detection device; and a state evaluation device configured to evaluate the state of the player that is correlated with the predetermined operation, on the basis of the result of detection by the state detection device.

A control method of the present invention is of a control method of controlling a computer which is incorporated into a game machine comprising an input apparatus that includes at least an operation unit, providing a game that demands a predetermined operation on the operation unit from a player, and comprising; an operation detection device configured to detect the predetermined operation upon the operation unit; a state detection device configured to detect the state of the player who is playing the game, and wherein the control method comprises; an operation evaluation step that evaluates the predetermined operation by the player on the basis of the result of detection by the operation detection device; and a state evaluation step that evaluates the state of the player that is correlated with the predetermined operation, on the basis of the result of detection by the state detection device.

A non-transitory computer readable storage medium of the present invention is of a non-transitory computer readable storage medium storing a computer program for a game machine comprising an input apparatus that includes at least an operation unit, and providing a game that demands a predetermined operation on the operation unit from a player, and comprising: an operation detection device configured to detect the predetermined operation upon the operation unit; a state detection device configured to detect the state of the player who is playing the game, and wherein the computer program for the game machine is configured so as to cause a computer which is incorporated into the game machine, to function as; an operation evaluation device configured to evaluate the predetermined operation by the player on the basis of the result of detection by the operation detection device; and a state evaluation device configured to evaluate the state of the player that is correlated with the predetermined operation, on the basis of the result of detection by the state detection device.

DESCRIPTION OF EMBODIMENTS

Figure 1:
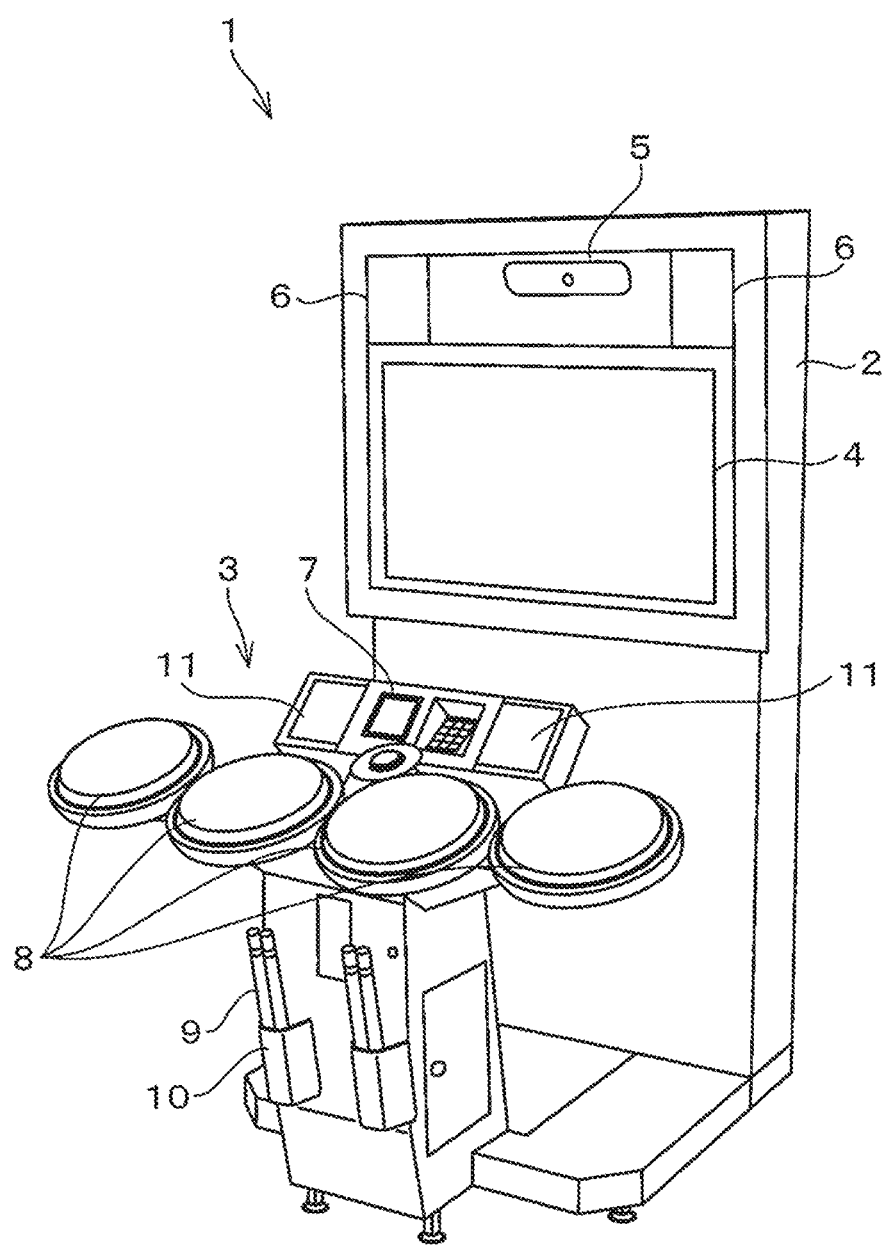
FIG. 1 is a figure schematically showing the external appearance of a game machine according to an embodiment of the present invention.

Embodiments of the game machine according to the present invention will now be explained. FIG. 1 is a figure schematically showing the external appearance of a game machine 1 according to one embodiment of the present invention. This game machine 1 is built as a game machine for commercial use that provides a predetermined range of music games to players, in exchange for provision of a payment of a predetermined consideration. In concrete terms, as shown in FIG. 1, the game machine 1 comprises a casing 2 and an input apparatus 3. The input apparatus 3 is used for input of playing actions and so on by the player. Moreover, a monitor 4 is provided at the upper portion of the casing 2. This monitor 4 is disposed at the front of the casing 2, so that its display surface faces in the direction of the input apparatus 3, in other words facing towards the player. Moreover, a state detection apparatus 5 is provided above the monitor 4. Casing side speakers 6 are provided at both sides of this state detection apparatus 5, and these serve as one example of audio output devices.

The state detection apparatus 5 is one example of a state detection device, and is an apparatus for detecting the state of the player during play. In concrete terms, this state detection apparatus 5 may, for example, include an optical sensor OS and a depth sensor. The depth sensor is a per se known sensor for detecting the distance (i.e. the depth) between the state detection apparatus 5 and the player. And the optical sensor OS is a per se known sensor for detecting the movements of various sites upon the body of the player. The optical sensor OS includes a camera. This camera is disposed so that its direction of photography faces toward the input apparatus 3. In more concrete terms, the camera is disposed so that the playing actions of the player are included in its range of photography. And, on the basis of the results of photography by the camera, the optical sensor OS detects the positions and the movements of various sites upon the body of the player. As one example, this detection may utilize so called bone information. "Bone information" means information about the bones of the player. In this manner, the state detection apparatus 5 is a per se known device that detects the state of the player during play, i.e. that detects the movements and the depths of various sites upon the body of the player, on the basis of the optical sensor OS and the depth sensor and so on. Moreover, the state detection apparatus 5 is adapted to detect the state of the player repeatedly on a predetermined cycle.

A card reader 7 and four play operation units 8 (which are examples of "operation units") are provided to the input apparatus 3. Moreover, stick holders 10 for holding sticks 9 are provided to the input apparatus 3. The card reader 7 is an apparatus for reading information upon a card SM (refer to FIG. 2) that is possessed by the user. Input apparatus side speakers 11, which serve as audio output devices, are provided on both sides of the card reader 7. Each of the play operation units 8 has the shape of a drum, which is a percussion musical instrument which is struck. On the other hand, the sticks 9 are used for inputting playing actions to the play operation units 8. In concrete terms, for example, operations such as striking the upper surface of a play operation unit 8 with a stick 9 are inputted to the play operation units 8 as playing actions. Incidentally, it should be understood that, apart from the above, input apparatuses and output apparatuses of various types typically provided to game machines for commercial use, such as push button switches, a cruciform key, and so on are provided to the game machine 1.

Figure 2:
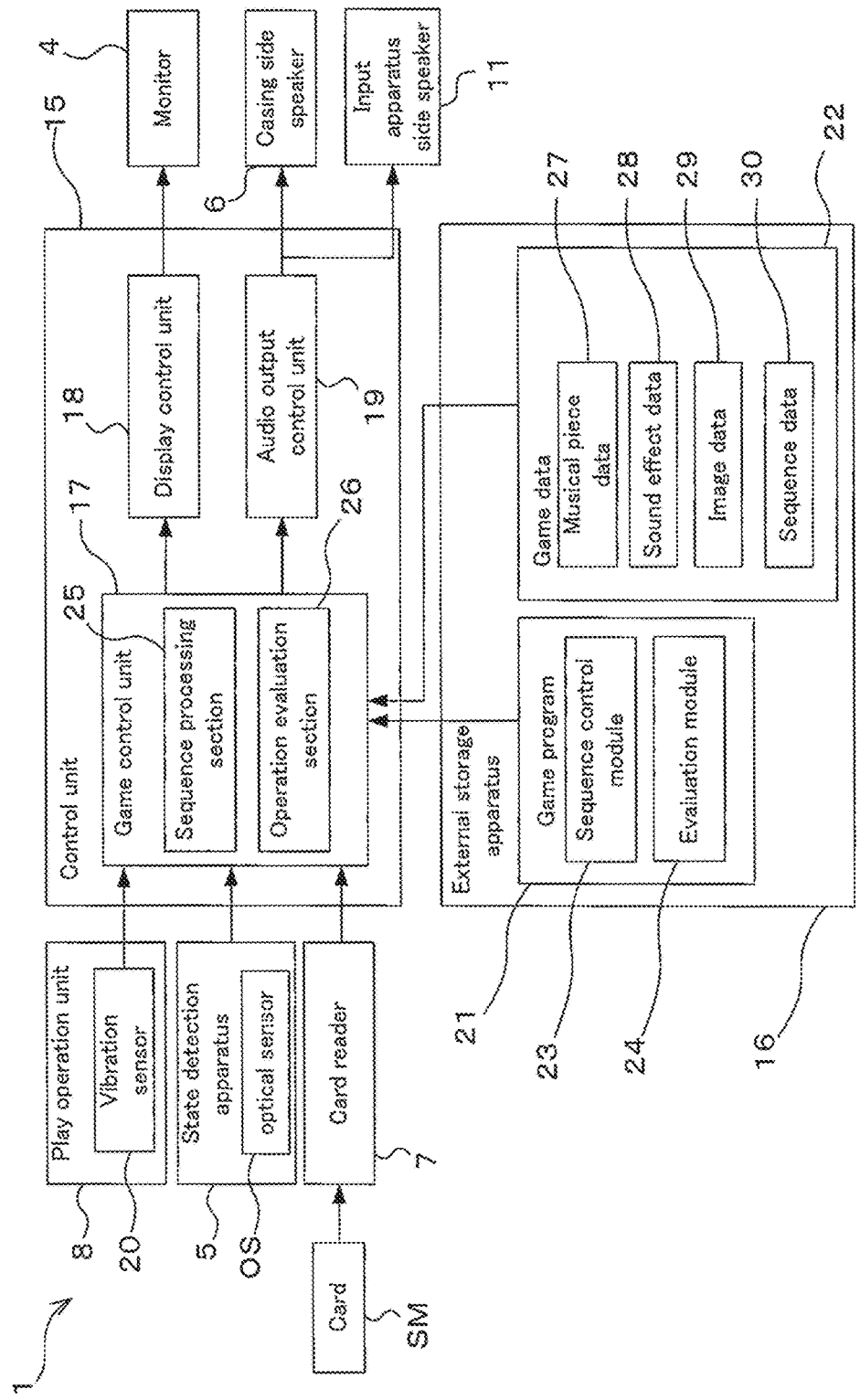
FIG. 2 is a functional block diagram of the principal portions of this game machine according to an embodiment of the present invention.

The structure of the game machine 1 will now be further explained with reference to FIG. 2. FIG. 2 is a functional block diagram of the principal portions of this game machine 1. As shown in FIG. 2, a control unit 15 which is serving as a computer and an external storage apparatus 16 are provided to the game machine 1. The control unit 15 comprises a game control unit 17 that serves as a control core, and a display control unit 18 and an audio output control unit 19 that operate according to output from this control unit 17. The game control unit 17 is built as a unit in which a microprocessor and peripheral devices of various types that are required for the operation of this microprocessor, such as internal storage devices (as an example, ROM and RAM), and so on are combined. The display control unit 18 draws an image in a frame buffer according to drawing data supplied from the game control unit 17, and displays a predetermined image upon the monitor 4 by outputting an image signal corresponding to the drawn image. And, by generating an audio reproduction signal according to audio reproduction data supplied from the game control unit 17 and outputting this signal to the casing side speakers 6 and to the input apparatus side speakers 11, the audio output control unit 19 reproduces a predetermined piece of music (including sound effects and so on) from these speakers 6 and 11. Accordingly, the monitor 4, the casing side speakers 6, and the input apparatus side speakers 11 are connected to the control unit 15.

Vibration sensors 20 which serve as examples of actuation detection device, are provided internally to the play operation units 8. These vibration sensors 20 detect vibrations of the upper surfaces of the play operation units 8. This type of vibration may, for example, be generated when the upper surface of a play operation unit 8 has been struck using a stick 9. In other words, the vibration sensors 20 detect action by the player when he strikes any one of the play operation units 8. These vibration sensors 20 are connected to the control unit 15, and output the results of their detection to the game control unit 17.

Furthermore, the state detection apparatus 5 and the card reader 7 described above are also connected to the control unit 15. The results of detection by the state detection apparatus 5 are outputted to the control unit 15. Moreover, these detection results may, for example, also be stored at least temporarily in an internal storage device of the game control unit 17. The card reader 7 reads in information upon a card SM, and outputs a signal corresponding to this information to the control unit 15. A non volatile storage medium (not shown in the figures) such as an IC chip or a magnetic stripe is provided upon the card SM. And, for example, a unique ID for each card SM (hereinafter sometimes called the "card ID") and an amount of consideration that is available for use may be provided upon this storage medium. In other words, as one example, the card reader 7 may read in the amount of consideration that is available for use which is stored in the storage medium of the card SM, and may output this to the control unit 15. And this consideration, for example, may be used for playing the game. Furthermore, the amount of consideration that is available for use stored in the storage medium of the card SM may be reduced by the control unit 15, via the card reader 7, according to the amount of consideration that has been consumed by playing. Moreover, the card ID may, for example, be used for specifying the player. This kind of specification, for example, may be implemented via data for establishing a correspondence between an ID that is unique for each player and the card ID. Yet further, if the game machine 1 is connected to a server via a network such as the internet or the like, then this type of data may be supplied from the server. Incidentally, it should be understood that, instead of the storage medium upon the card SM, it would also be acceptable to employ a storage medium such as an IC chip or the like that is implemented in a portable telephone or the like.

In addition, an external storage apparatus 16 is connected to the control unit 15. A storage medium is used for this external storage apparatus 16 that can maintain storage even if no supply of power is provided, such as, for example, a magnetic storage medium such as a hard disk or the like, an optical storage medium such as a DVD ROM or a CD ROM or the like, or a non volatile semiconductor memory device such as an EEPROM or the like.

A game program 21 and game data 22 are stored in the external storage apparatus 16. The game program 21 is a computer program that is required in order for the game machine 21 to perform a music game according to a predetermined procedure. The game program 21 includes a sequence control module 23 and an evaluation module 24. When the game machine 1 is started, by executing an operation program which is stored in the internal storage device, the game control unit 17 performs processing of various types required for operation as the game machine 1. Next, by reading in the game program from the external storage apparatus 16 and executing it, the game control unit 17 sets an environment for performing the music game according to the game program 21.

A sequence processing section 25 is constituted by the game control unit 17 executing the sequence control module 23 of the game program 21. Moreover, an operation evaluation section 26 is constituted by the game control unit 17 executing the evaluation section 24 of the game program 21. The sequence processing section 25 performs music game processing, such as processing for commanding operational timings to the player to match reproduction of the music (i.e. of the piece of music) which has been selected by the player, and processing for generating sound effects or the like corresponding to actions by the player. And the operation evaluation section 26 performs processing for evaluating actions by the player. This sequence processing section 25 and this operation evaluation section 26 are logical devices that are implemented as combinations of computer hardware and computer programs. Incidentally, it should be understood that, apart from the modules 23 and 24 described above, program modules of various types that are required for execution of the music game are also included in the game program 21. Moreover, logical devices corresponding to those modules are also constituted by the game control unit 17. However, these are not shown in the figures.

Data of various types to be referred to during execution of the game program 21 is included in the game data 22. For example, musical piece data 27, sound effect data 28, and image data 29 are included in the game data 22. The musical piece data 27 is data that is required in order to output a reproduction of the piece of music that is the subject of the game from the speakers 6 and 11. While only one item of musical piece data 27 is shown in FIG. 2, actually the player is able to select the piece of music to be played from a plurality of pieces of music. Information is attached in the game data 22 for identifying each of the tunes of this plurality of musical piece data. The sound effect data 28 is data in which sound effects of a plurality of types that are to be outputted from the speakers 6 and 11 in response to actions by the player are recorded in correspondence with a unique code for each of those sound effects. As well as the sounds of musical instruments, these sound effects include audio of various kinds. For various types, number of predetermined octaves with different music intervals may be prepared as this sound effect data. And the image data 29 is data for displaying a background image, objects of various types, icons, and so on within a game screen upon the monitor 4.

Furthermore, sequence data 30 is included in the game data 22. This sequence data 30 is data in which operational timings and so on that are to be commanded to the player are defined. At a minimum, a single item of sequence data 30 is provided for a single item of musical piece data 27. The details of this sequence data 30 will be described hereinafter.

Figure 3:
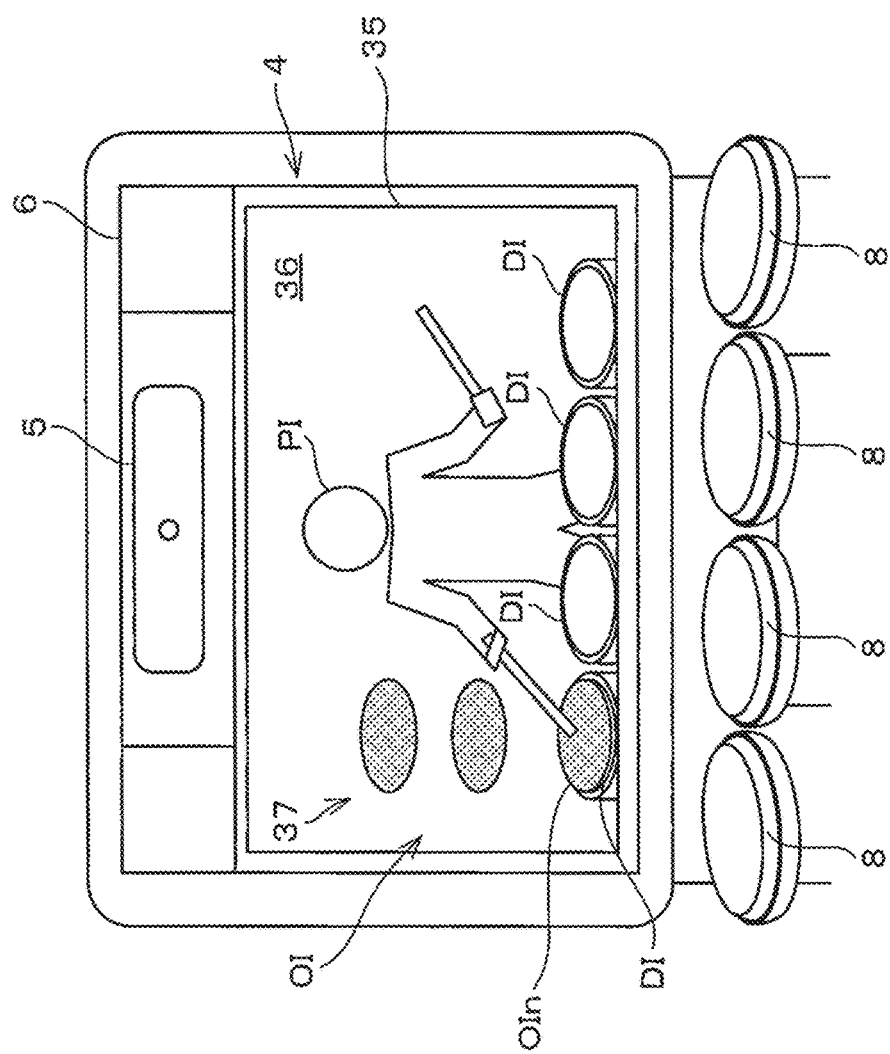
FIG. 3 is a figure schematically showing an enlarged view of principal portions around a monitor upon which an example of a game screen is displayed.

Next, a summary of the music game that is provided by this game machine 1 will be explained. The music game provided by the game machine 1 is one in which predetermined playing actions are demanded at predetermined timings. And these predetermined timings correspond to timings for actions upon a predetermined musical instrument during the music, and thereby performances of a musical instrument which forms the music are implemented by the predetermined playing actions. Moreover, in the guidance according to these predetermined timings, there is utilized an image of an extended space in which images of an actual space and images of a virtual space are merged together. This will now be explained with reference to FIGS. 3 and 4. FIG. 3 is a figure schematically showing an enlarged view of principal portions around the monitor 4, with an example of a game screen being displayed upon the monitor 4. As shown in FIG. 3, a game screen 35 is displayed upon the monitor 4. An image 36 of an actual space and an AR image 37 are included in this game screen 35. As the actual space image 36, there is used an image which is photographed by the optical sensor OS. In concrete terms, the player who is performing playing actions and the four play operation units 8 are included in the range of photography of the optical sensor OS. Due to this, a player image PI that corresponds to the player is included in the actual space image 36. And this player image PI is an image of the player that has been photographed by the optical sensor OS.

On the other hand, the AR image 37 is an image in a virtual space, and is disposed above the actual space image 36 so as to extend into the actual space. The AR image 37 functions as an object in the extended space that is created by merging together the actual space and the virtual space. In concrete terms, the AR image 37 includes four drum images DI which serve as standard reference marks and an object image OI that serves as a command mark. The four drum images DI are arranged so as to correspond, respectively, to the four play operation units 8 that are photographed by the camera of the optical sensor OS. Moreover, as one example, images of four different percussion musical instruments may be arranged in positions that correspond to the four play operation units 8. For example, images of a pair of cymbals, a snare drum, a bass drum, and a barrel type drum may be utilized as these images DI that correspond to the four play operation units 8. In other words, as one example, drum images DI that correspond to a pair of cymbals, to a snare drum, to a bass drum, and to a barrel type drum may be arranged so as to correspond, respectively to the four play operation units 8 in the AR image 37. As a result, the drum images DI function as virtual percussion musical instruments in the extended space, i.e. as a pair of cymbals, as a snare drum, as a bass drum, and as a barrel type drum. Incidentally, it should be understood that the present invention is not limited to embodiments in which such an AR image is employed for the images corresponding to the play operation units 8. For example, it would also be acceptable for the images of the play operation units 8 that have been photographed by a camera to be employed just as they are as the drum images DI. In other words, the drum images DI are not limited to the format in which they are displayed as the AR image 37; it would also be possible for them to be displayed as the actual space image 36.

For each of the drum images DI, a virtual lane that extends upward from that drum image DI is provided. However, these virtual lanes are not displayed in the game screen 35. An object image OI is disposed upon each of the virtual lanes at appropriate timings in the piece of music that is being reproduced during the game. Moreover, the object image OI appears at the upper end of the virtual lane, in other words at the opposite end of the drum image DI. And the object image OI shifts along the virtual lane down toward the drum image DI, so that the distance between it and the drum image ID decreases as the piece of music progresses. In other words, each of the drum images DI also functions as an arrival position for the object image OI. And the object images OI disappear from the game screen 35 after they have become superimposed upon the upper surfaces of the corresponding drum images DI.

Normal object images OIn and images OIs of a special object are included in the object images OI. The normal object images OIn and the special object images OIs have mutually different shapes. Moreover, the playing actions to the player which are commanded by the normal object images OIn and the special object image OIs are also mutually different. In concrete terms, the normal object images OIn are formed in a similar shape to the upper surfaces of the drum images DI. And the normal object images OIn are displayed in order to command the timings (i.e. the operational timings) at which appropriate operations must be performed. In more concrete terms, the player is demanded to perform appropriate operations matched to arrival of the normal object images OIn at the drum images DI, in other words matched to when the positions of the normal object images OIn and the positions of the drum images DI coincide with one another. And the operations of striking each of the play operation units 8 with a stick 9 correspond to appropriate actions. In other words, a striking operation is demanded of the player, of striking the play operation unit 8 corresponding to the drum image DI at which a normal object image OIn has arrived, matched in timing to the agreement of the position of that normal object image OIn and the position of that drum image DI. Furthermore, the time interval of deviation is detected between the time point at which the normal object image OIn arrives at the drum image DI and the time point at which the player performs that appropriate operation. And the operation by the player is evaluated the higher, the smaller this time interval of deviation is. Moreover, a sound effect corresponding to the play operation unit 8 upon which the striking operation has been performed, in more concrete terms a sound effect corresponding to the percussion musical instrument suggested by the drum image DI that is disposed on that play operation unit 8, is reproduced from the input apparatus side speaker 11 that is disposed closer to that play operation unit 8. Incidentally, it should be understood that the piece of music that is the subject of the game is reproduced and outputted from the casing side speaker 6 that is disposed further from that play operation unit 8. By reproducing and outputting the sound effect from the input apparatus side speaker 11 that is disposed closer to the play operation unit 8 in this manner, it is possible to give the player the feeling that the sound effect is being generated from that play operation unit 8.

In the example of FIG. 3, upon the game screen 35, the player image PI is shown further away than the drum images DI. This corresponds to the result of photography of the player during play, who is positioned beyond the four play operation units 8 as seen from the direction of photography of the camera. Moreover, on the virtual lane of the drum image DI at the left end, a normal object image OIn directly after having arrived at that drum image DI is shown. And a player image PI of the player who is executing the appropriate operation is displayed matched to arrival of the normal object image OIn at the drum image DI at the left end. In more concrete terms, matched to the arrival of the normal object image OI to the drum image DI at the left end, a player image PI is displayed corresponding to the player who is executing striking operation upon the play operation unit 8 at the left end with a stick 9. Incidentally, it should be understood that it would also be acceptable to arrange for the transparency of the object images OI to decrease, according to decrease of their distances from the drum images DI. In other words, it would be acceptable for the object images OI to be displayed at high transparency at the upper portions of the virtual lanes so that the background is displayed more vividly, and for the object images OI to be progressively displayed more vividly than the background as they approach each of the drum images DI, so that the display of the background is progressively more blocked. In this case, it is possible to display the background as a priority along the upper parts of the tracks, while still reliably providing guidance for the arrival timings of the object images OI. Due to this, it is possible to expand the range over which the actual space image 36 is preferentially displayed.

Figure 4:
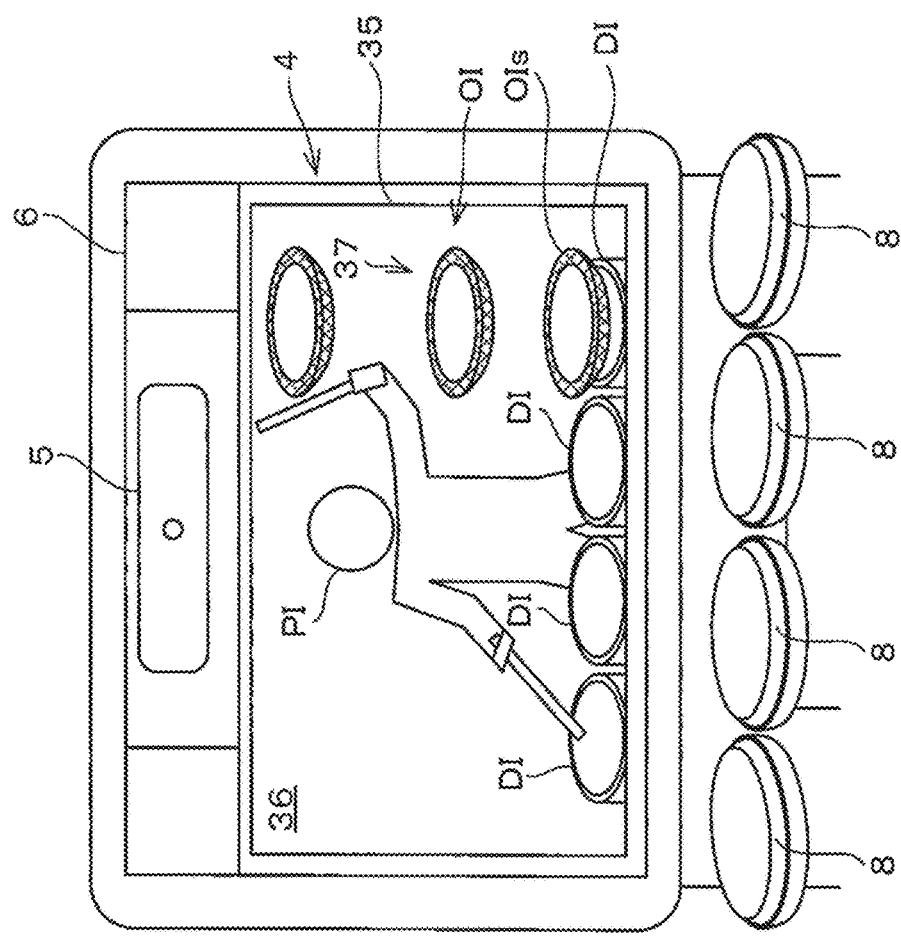
FIG. 4 is a figure schematically showing an example of a game screen when an image of a special object is being displayed.

On the other hand, an embodiment is employed for the special object image OIs which makes it stand out more to the eye than the normal object images OIn do. FIG. 4 is a figure schematically showing an example of the game screen when a special object image OIs is being displayed. As one example, as shown in FIG. 4, an embodiment is employed for the special image object OIs that is bigger and thicker than that of the normal object image OIn. Furthermore, the color that is employed for the special object image OIs is different from that of the normal object image OIn. Moreover, the special object image OIs is displayed in order to command the player to perform some special playing action(s). For example, an appropriate operation and a predetermined gesture (i.e., a predetermined action) may be included as such special playing actions. In other words, the appearance of the special object image OIs constitutes a demand that the player should make a predetermined gesture (i.e., should perform a predetermined action), in addition to performing an appropriate operation at the timing at which that appropriate operation must be performed. Furthermore, as this predetermined gesture, a gesture (i.e., a predetermined action) may be employed that is similar to a gesture made by a performer when he is performing upon real drums that correspond to the shapes of the play operation units 8. In concrete terms, when the special object image OIs arrives at its drum image DI, a demand to perform the appropriate action and to make the predetermined gesture (i.e., to perform the predetermined action) is made to the player. As the predetermined gesture, for example, a gesture may be employed in which, before striking the upper surface of the play operation unit 8, the player raises the stick 9 upwards higher than his shoulder. In this case, the special playing action demanded of the player is that he should perform the appropriate operation through performing the predetermined gesture.

In the example of FIG. 4, a special object images OI is displayed on the game screen 35 as the AR image 37 upon the virtual lane of the drum image DI on the right end. And one of these special object images OIs is positioned directly before arriving at the drum image DI at the right end. A special playing action is demanded of the player, matched to the arrival of this special object image OIs. In concrete terms, matched to the arrival of the special object image OIs at the drum image DI at the right end, the player is demanded to perform striking operation with a stick 9 upon the play operation unit 8 at the right end, after having raised the stick 9 higher than his shoulder. Due to this, in the example FIG. 4, there is displayed a player image PI corresponding to the player who is making the gesture (i.e. the action) of raising the stick 9 higher than his shoulder so as to strike the play operation unit 8 at the right end with the stick 9, matched to the arrival of the special object image OIs at the drum image DI at the right end. In other words, the player who is making the gesture (i.e. the action) of raising the stick 9 higher than his shoulder is detected by the optical sensor OS, and the result of this photography is displayed as a player image PI.

Subsequently, matched to the arrival of the special object image OIs at the drum image DI at the right end from this gesture, these operation and action of striking upon the play operation unit 8 at the right end with the stick 9 are evaluated with the execution of the operation and the action. In other words, when a special object image OIs is used in a command for an operational timing, both the predetermined action and also its operational timing are evaluated. In more concrete terms when the play operation unit 8 is struck after the predetermined action has been performed, the time interval of deviation between the timing at which the play operation unit 8 has been struck and the timing at which the special object image OIs arrives at the drum image DI is evaluated. Moreover, in a similar manner to the case of a normal object image OIn, the smaller this time interval of deviation is, the higher is this evaluation. Furthermore, in a similar manner, corresponding to the drum image DI that is disposed at the play operation unit 8 upon which striking operation has been performed, a sound effect is also reproduced.

Figure 5:
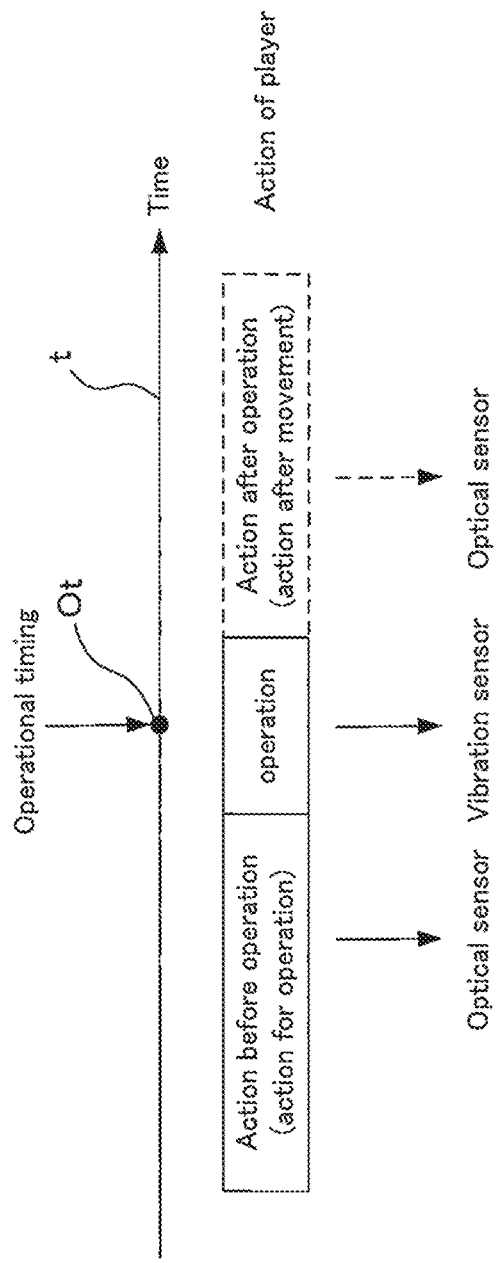
FIG. 5 is an explanatory figure for explanation of actions that a player executes in order to play a music game.

The actions performed by the player in order to play the music game will now be further explained with reference to FIG. 5. FIG. 5 is an explanatory figure for explanation of the actions that the player executes in order to play the music game. In FIG. 5, the arrowed line t extending transversely represents the flow of time. Furthermore, the black dot Ot upon the arrowed line t represents an operational timing at which an appropriate operation is to be performed. As shown in FIG. 5, in the actions that the player is to execute in order to play the music game, not only actions for performing appropriate operations, but also actions before such operations and actions after such operations are included. For example, in the actions before such operations, there are included preparatory actions for executing appropriate actions. The action described above of raising the stick 9 higher than the shoulder in order to strike one of the play operation units 8 corresponds to such a preparatory operation. Moreover, for example, in the actions after such operations, there are included actions after the fact, that are performed after appropriate actions have been executed. In other words, all of the actions before operations and the actions after operations correspond to actions that are correlated with appropriate operations.

And, if guidance is given for an operational timing using a normal object image OIn, in other words if guidance is given for an operational timing via decrease of the distance between a normal object image OIn and its drum image DI, then, among these actions, the timing at which the player has actually performed the action is evaluated. In other words, the appropriate operation is evaluated, but actions before and after the appropriate action are not evaluated. Furthermore, the result of detection by the vibration sensor 20 is employed in this evaluation.

On the other hand, if guidance is given for an operational timing using a special object image OIs, in other words if guidance is given for an operational timing via decrease of the distance between a special object image OIs and its drum image DI, then not only the timing at which the player has actually performed the operation is evaluated, but also the action before this operation is evaluated. In more concrete terms, if guidance is given for an operational timing using a special object image OIs, then, in addition to the appropriate operation, also the gesture for performing this operation, in other words the preparatory action, is evaluated. Moreover, the result of detection by the optical sensor OS is employed in the evaluation of this action before the appropriate operation. In other words, by using the vibration sensor 20 and the optical sensor OS separately, not only the action of executing the appropriate operation is evaluated, but also an action of a different type, i.e. the preparatory action before it, is added as a subject for evaluation. In this manner, in this music game on the game machine 1, guidance is given for the appropriate operational timings via the distances between the object images OI and the drum images DI. Moreover, in this music game, by employing the special object image OIs, not only is the appropriate operation evaluated, but also a predetermined action (i.e., a predetermined state) in order to perform this operation is evaluated.

Figure 6:
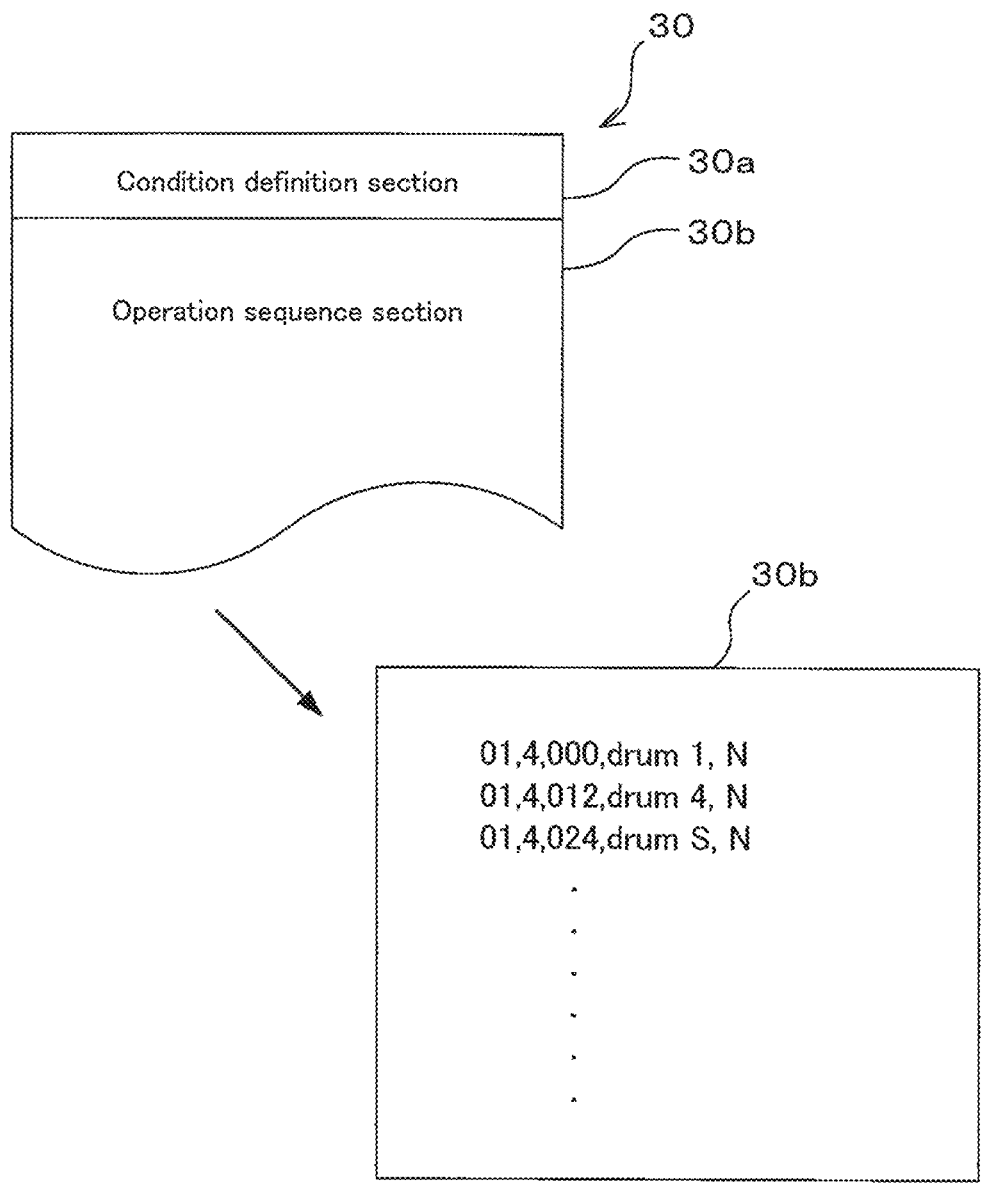
FIG. 6 is a figure showing an example of contents of sequence data.

Next, the details of the sequence data 30 will be explained with reference to FIG. 6. FIG. 6 is a figure showing an example of the contents of the sequence data 30. As shown in FIG. 6, the sequence data is provided with a condition definition section 30a and an operation sequence section 30b. Information is described in the condition definition section 30a specifying various types of condition for execution of the game, such as information specifying the tempo, the beat, the track and so on of the music, information specifying conditions for execution of a different game for each piece of music, and the like.

On the other hand, correspondence between the timings at which the appropriate operations are to be performed and time points in the piece of music is described in the operation sequence section 30b. In other words, as partially shown in FIG. 6, the operation sequence section 30b includes information specifying the operational timings at which operations during the piece of music must be performed, information specifying any one of the four drum images DI, and information specifying the types of the object images OI. And the operation sequence section 30b is built as a set of a plurality of records in which mutual correspondences between items of these types of information are described. The operational timings are described so that values that specify the time points in the piece of music of bar portions, numbers of beats, and time points during beats are separated by commas. The time points during beats are elapsed times from the heads of the beats, and are expressed in numbers of units from the heads of the beats, where the length of the time interval of one beat is divided into n unit time periods. For example if the time point on the second beat of the first bar of the piece of music, and moreover at the point that just ¼ of that beat has elapsed from the head of the beat, is specified as an operational timing, then this is described as "01, 2, 025".

Each of the drum images DI is specified by information corresponding to that drum image DI. For example, as this information specifying each of the drum images DI, the information "drum 1", "drum 2" and so on corresponding to each of the four drum images DI may be described. The types of the object images OI are specified by information corresponding to normal object images OIn or to a special object image OIs. In concrete terms, for example, "N" may be employed as the information corresponding to the normal object images OIn, while "S" may be employed as the information corresponding to the special object images OIs.

In the example of FIG. 6, there is described a command of operation to the drum image DI corresponding to "drum 1" at the start time point (000) of the fourth beat in the first bar. Moreover, "N" is specified as the type of the object image OI that is to be used in this case. And "drum 1" corresponds, for example, to the drum image DI at the left end. In other words, in this case, a normal object image OIn is displayed upon the virtual lane of the drum image DI at the left end, so as to arrive at this drum image DI at the start time point (000) of the fourth beat of the first bar. And the player is demanded to perform the playing action of appropriate operation upon the play operation unit 8 corresponding to the drum image DI at the left end, in time with matching the arrival of this normal object image OIn at the drum image DI at the left end, in other words at the start time point (000) of the fourth beat of the first bar.

On the other hand, at the timing that a time interval corresponding to "024" has elapsed from the start time point of the fourth beat of the first bar, a special object image OIs is displayed upon the virtual lane of the second drum image DI from the left end, so as to arrive at this drum image DI. And, at a timing that matches the arrival of this special object image OIs at the second drum image DI from the left end, in other words at a timing that corresponds to "024" from the start time point of the fourth beat of the first bar, the player is demanded to perform the special playing action of executing appropriate operation to the play operation unit 8 corresponding to this drum image DI, after having executed the predetermined gesture. In concrete terms, the player is demanded to perform striking operation upon the second play operation unit 8 from the left which corresponds to the second drum image DI from the left end, after having made the predetermined gesture of raising the stick 9 higher than his shoulder. The operational timings, the play operation units upon which these operations are to be performed, and the playing actions that are to be performed, are specified by the sequence data 30 in this manner.

Figure 7:
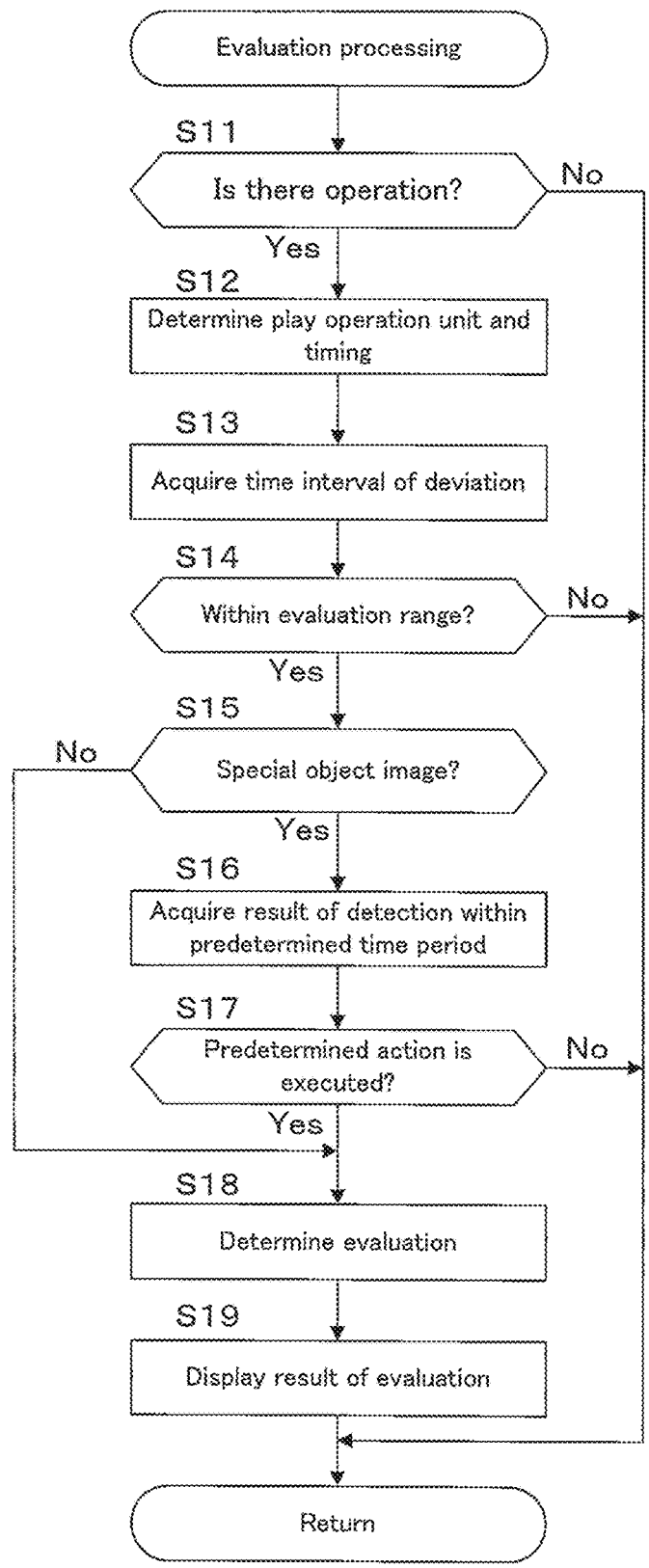
FIG. 7 is a figure showing an example of a flow chart for an evaluation processing routine.

Next, the evaluation processing will be explained. This evaluation processing is executed in order to evaluate the playing actions of the player. FIG. 7 is a figure showing an example of a flow chart for the evaluation processing routine. The routine of FIG. 7 is executed by the operation evaluation section 26 of the game control unit 17. Moreover, as one example, the operation evaluation section 26 may execute the routine of FIG. 7 repeatedly on a predetermined cycle. Incidentally, it should be understood that while, for example, other than the routine of FIG. 7, the game control unit 17 also executes processing of various per se known types through the sequence processing section 25 and so on, such as processing for controlling the positions of the object images OI, processing for determining the types of the object images OI that are to be disposed upon the virtual lanes, and the like so that the object images OI should arrive at the drum images DI at the operational timings that are specified by the sequence data 30, detailed explanation thereof will be omitted.

When the routine of FIG. 7 starts, in a first step S11, the operation evaluation section 26 refers to the output signals of the vibration sensors 20, and determines upon the presence or absence of operation upon the play operation units 8. And if the result of this determination is negative, in other words if no operation is being performed upon any of the play operation units 8, then the operation evaluation section 26 skips the subsequent processing and this cycle of the routine is terminated.

On the other hand, if the result of the determination in the step S11 is affirmative, in other words if an operation has been performed upon one of the play operation units 8, then the operation evaluation section 26 transfers the flow of control to a step S12. In this step S12, the operation evaluation section 26 determines the play operation unit 8 upon which an operation has been performed and the timing at which the operation has been performed. Next in a step S13 the operation evaluation section 26 specifies the most recent operational timing described in the sequence data 30 in relation to the play operation unit 8 upon which the operation has been performed, in other words specifies the operational timing in the sequence data 30 that approaches most closely thereto in time, and acquires the time interval of deviation between that operational timing and the time point that the signal was outputted from the vibration sensor 20.

Next, in a step S14, the operation evaluation section 26 evaluates whether or not this operation by the player is appropriate by determining whether or not the time interval of deviation is within an evaluation range. This evaluation range is set to a predetermined time interval range before and after the operational timing that is the subject of comparison, and is centered upon that operational timing. Moreover, as one example, the predetermined time interval range may be classified into a plurality of levels, and these levels may be evaluated higher the closer they are to the center. If this result is negative, in other words if the time interval of deviation is outside the evaluation range, then the operation evaluation section 26 skips the following processing, and this cycle of the routine is terminated.

On the other hand, if the result of the evaluation in the step S14 is affirmative, in other words if the time interval of deviation is within the evaluation range, then the operation evaluation section 26 transfers the flow of control to a step S15. In this step S15, the operation evaluation section 26 determines whether or not the type of the object image OI corresponding to the most recent operational timing that is described in the sequence data 30 is a special object image OIs. If the result of this determination is negative, in other words if the type of the object image OI corresponding to this operational timing is not a special object image OIs, then the operation evaluation section 26 skips the step S16 and the step S17, and transfers the flow of control to a step S18. On the other hand, if the result of this determination is affirmative, in other words if a special object image OIs corresponds to this operational timing, then the operation evaluation section 26 transfers the flow of control to a step S16.

In this step S16, the operation evaluation section 26 acquires the result of detection by the state detection apparatus 5 within a predetermined time period. This predetermined time period is set to a standard in reference to the most recent operational timing described in the sequence data 30. Moreover, the operational timing is taken as a reference, and the time period before this operational timing is used as the predetermined time period. In other words, in this step S16, the operation evaluation section 26 acquires the result of detection by the state detection apparatus 5 that is included in the interval from the predetermined time period before the operational timing, to the operational timing.

Next in the step S17, on the basis of the result of detection acquired in the step S16, the operation evaluation section 26 evaluates the state of the player, such as a state of whether or not he is executing the predetermined action. This evaluation may, for example, be made in the following manner. The state of the player for each time on a predetermined cycle is included in the result of detection by the state detection apparatus 5. Moreover, on the basis of the optical sensor OS, the state detection apparatus 5 detects movements of various sites upon the body of the player as being the state of the player. In other words, the positions of various sites on the body of the player each time on the predetermined cycle are included in the results of detection. On this basis, the operation evaluation section 26 determines whether or not a predetermined operation (i.e. a gesture) in which various sites upon the body of the player come into a predetermined positional relationship is included in the results of detection. As one example of such a predetermined operation, the preparatory action of raising the stick 9 above the shoulder of the player before he performs the operation may be employed. In other words, the operation evaluation section 26 determines whether or not the preparatory action of coming into a positional relationship in which the arm of the player is raised higher than his shoulder is included in the results of detection during the predetermined time period. And, if this preparatory action is not included in the results of detection during the predetermined time period, then the operation evaluation section 26 makes an evaluation of a negative result, while, if this preparatory action is included in the results of detection during the predetermined time period, then the operation evaluation section 26 makes an evaluation of an affirmative result. The operation evaluation section 26 performs its evaluation in the step S17 in this manner. And, if this evaluation result is a negative one, then the following processing is skipped, and this cycle of the routine is terminated.

On the other hand, if the result of the evaluation in the step S17 is affirmative, then the operation evaluation section 26 transfers the flow of control to the step S18. In this step S18, the operation evaluation section 26 determines an evaluation in relation to the playing action by the player. In concrete terms, on the basis of the result of evaluation in the step S14, the operation evaluation section 26 determines an evaluation in relation to the playing action by the player by determining to which of a plurality of levels among a predetermined range of the time interval of deviation acquired in the step S13 belongs. In this evaluation corresponding to the plurality of levels, it is acceptable for there to be a difference between the result of evaluation in relation to a normal object image OIn and the result of evaluation in relation to a special object image OIs. In other words, it is acceptable for there to be a difference between the result of evaluation in relation to a normal object image OIn and the result of evaluation in relation to a special object image OIs, even in a case in which they correspond to the same level. As one example, if they correspond to the same level, it would be possible for the result of evaluation in relation to a special object image OIs to be higher than the result of evaluation in relation to a normal object image OIn.

Then the operation evaluation section 26 proceeds to a step S19, and, in this step S19, controls output to the display control unit 18 so that the result of evaluation is displayed upon the game screen 35. When the processing of this step S19 has been completed, the operation evaluation section 26 terminates this cycle of the routine. Due to this, it is evaluated whether or not the operation by the player in relation to the normal object image OIn has been executed at the appropriate timing. Furthermore, if guidance has been given by a special object image OIs in relation to the operational timing, then it is evaluated whether or not the special playing action has been performed. In other words, the playing action of the player is evaluated both on the basis of whether or not the operation by the player has been performed at the appropriate timing, and also on the basis of whether or not this operation has been performed via the predetermined action.

As has been explained above, according to this embodiment, the presence or absence of operations upon the play operation units 8 and the timings of these operations are detected by the vibration sensors 20, and the results of these detections are evaluated. Furthermore, the presence or absence of a preparatory action for executing an operation upon the play operation units 8 is detected by the optical sensor OS, and the result of this detection is evaluated. Accordingly, not only operations executed by the player, but also preparatory actions of these operations can be included within the range for evaluation. In other words, as playing actions, in addition to the appropriate operations, it is also possible to demand that the player should perform actions that are appropriate for preparing to perform those operations. Due to this, it is possible to expand the range of playing actions that are demanded from the player. Moreover, by including appropriate preparatory actions in the playing actions, it is possible to make the player execute predetermined actions. Since, due to this, during execution of operations upon the play operation units 8, it is possible to demand that the player should execute performance actions when performing upon a musical instrument such as, for example, drums, accordingly it is possible to enhance the interest level of the game.

In the embodiment described above, by executing the routine of FIG. 7 via the operation evaluation section 26 of the game control unit 17, the control unit 15 functions as the "operation evaluation device", as the "state evaluation device", and as the "evaluation determination device" of the Claims of the present invention. Moreover, by reproducing the piece of music from the speakers 6 and 11 via the game control unit 17 and the audio output control unit 19, the control unit 15 functions as the "piece of music reproduction device" of the Claims of the present invention. On the other hand, by storing the musical piece data 27, the external storage apparatus 16 functions as the "musical piece data storage device" of the Claims of the present invention.

The present invention is not to be considered as being limited to the embodiment described above; it could be implemented in various appropriate embodiments. In the embodiment described above, as the special playing actions, in addition to the appropriate operations, appropriate preparatory actions were detected and were evaluated. However, the special playing actions are not to be considered as being limited to embodiments like those shown. For example, it would also be possible, instead of an appropriate preparatory action, or in addition to an appropriate preparatory action, for an appropriate action after the fact to be included in a special playing action. In other words, it would be acceptable, as the special playing action, it would be acceptable to detect and to evaluate both the appropriate operation and also an appropriate action after the fact. Depending on a musical instrument such as a guitar or the like, there is a case in which distinctive actions are also included in actions after performance. In this type of case, it is possible further to enhance the sense of presence by demanding that the player should perform such distinctive actions after the fact.

In the embodiment described above, the appropriate action and the appropriate operation were evaluated as a single playing action. In other words, if either one of them is not executed, then it is determined that the playing action has not been executed. However, the present invention is not to be considered as being limited to this type of embodiment. For example, it would also be acceptable to set a plurality of evaluation levels also for the appropriate action by classifying the positional relationship of the plurality of sites into a plurality of levels, and to reach a higher evaluation the closer that the operation is to the appropriate operation, while reaching a lower evaluation the further that the action is from the appropriate action. Moreover, it would also be possible for the appropriate action and the appropriate operation not to exert any mutual influence upon their evaluations. In other words, it would also be acceptable for the evaluations of the appropriate action and of the appropriate operation to be performed independently, without any mutual dependence.

In the embodiment described above, the input apparatus includes the operation units in the shape of drums to which striking operation by the player is inputted. However, the input apparatus is not limited to this type of embodiment. For example, as the input apparatus, it would also be acceptable to employ an input apparatus that is shaped in the form of a musical instrument of any of various types, such as a guitar shaped input apparatus or the like. And operation units may be employed that correspond to the shapes of these musical instruments of various types.

Moreover, in the embodiment described above, a music game was employed in which a piece of music was reproduced, and playing actions at timings corresponding to that piece of music were demanded from the player. However, the game that is supplied by the game machine 1 is not to be considered as being limited to a game of that type. For example, various types of game may be supplied by the game machine 1, such as a flag raising game in which a demand is made to the player to perform the action of raising a flag at a predetermined timing in a predetermined position, or the like. In other words, it would be acceptable to arrange for the game machine 1 to provide various types of game, such as an action game that demands predetermined actions and operations, or the like. Accordingly, while in the embodiment described above the timings at which the appropriate operations are performed are evaluated, the subjects for evaluation of operations are not to be considered as being limited to the embodiments described above. For example, it would also be possible simply to evaluate the presence or absence of operations as the appropriate operations. In a similar manner, the operation detection device is not limited to being a vibration sensor. For example, as the operation detection device, in order to detect the presence or absence of operations, it would also be possible to employ a simple circuit that outputs an ON/OFF signal; or it would also be acceptable to employ an acceleration sensor. In other words, as operation detection device, it would be also acceptable to employ any of various types of devices appropriately corresponding to the embodiments of operation units of various types.

In the embodiment described above, as one example, the optical sensor OS is employed as one example of the state detection device. However, the state detection device is not limited to this kind of embodiment. It would also be acceptable, for the state detection device, to employ a radio wave sensor or a thermal imaging sensor, provided that it is capable of detecting the state of the player during play. Furthermore, the game machine of the present invention may be implemented in any appropriate embodiment, i.e. as a game machine for business use that is installed in a commercial facility, as a game machine for household use that is installed in a personal residence, as a portable type game machine, or as a game machine for playing a game by employing a network.

The embodiment explained above may be understood as being an invention of the following aspect. Incidentally, it should be understood that, while in the following explanation reference symbols written between parentheses and referring to the attached drawings are appended in order to make this aspect of the present invention easy to understand, the technical range of the present invention is not to be considered as being limited in any way to the embodiment shown in the drawings.

That is to say, as an aspect of the present invention, it is possible to understand a game machine comprising an input apparatus (3) that includes at least an operation unit (8), and providing a game that demands a predetermined operation on the operation unit from a player, and wherein the game machine comprises: an operation detection device (20) configured to detect the predetermined operation upon the operation unit; a state detection device (OS) configured to detect the state of the player who is playing the game; an operation evaluation device (15) configured to evaluate the predetermined operation by the player on the basis of the result of detection by the operation detection device; and a state evaluation device (15) configured to evaluate the state of the player that is correlated with the predetermined operation, on the basis of the result of detection by the state detection device.

And, according to this aspect of the present invention, in addition to the predetermined operation upon the operation unit, also the state of the player that is correlated with this operation is detected and is evaluated. Accordingly, during play, not only the predetermined operation upon the operation unit, but also a state of the player that is correlated with this operation can be demanded from the player. In other words, it is possible to add the state of the player to the playing action that is demanded from the player. Due to this, it is possible to expand the range of playing actions that are demanded from the player.

In an aspect of the game machine according to the present invention, the state evaluation device, as the state of the player that is correlated with the predetermined operation, may evaluate a state that corresponds to a preparatory action for executing the predetermined operation. In this case, for example, it would be possible to guide this preparatory operation for executing the predetermined operation, to the predetermined action. In other words, it would be possible to demand the player to perform the predetermined action as a preparatory action. By doing this, it is possible to guide the preparatory operation to be more desirable.

In a similar manner, in an aspect of the game machine according to the present invention, the state evaluation device, as the state of the player that is correlated with the predetermined operation, may evaluate a state that corresponds to an action after the fact that is performed after the predetermined operation.

And, in an aspect of the game machine according to the present invention, there may be further provided an evaluation determination device (15) configured to determine an evaluation for the predetermined operation by the player on the basis of the results of evaluation by the operation evaluation device and by the state evaluation device. In this case, the evaluation of the predetermined operation by the player is determined both on the basis of the predetermined operation upon the operation unit and also on the basis of the state of the player. In other words, it is possible to evaluate both the predetermined operation and also the state of the player together as a compound playing action. Due to this, it is possible to guide the compound playing action that consists both of the predetermined operation and also of the state of the player to a more desirable form.

It would also be acceptable for the game machine to provide any type of game. For example, as an aspect of the present invention, as the game, there may be provided a game which arranges, on the basis of sequence data (30) in which operational timings are specified at which the predetermined operations are to be performed, command marks (OI) that correspond to the operational timings and a reference mark (DI) that corresponds to the present time point along a predetermined path in time order, and which teaches the operational timings to the player by creating relative displacement along the predetermined path between the command marks and the reference mark according to the progression of time so that the command marks agrees with the reference mark at the operational timings corresponding to the command marks. Moreover, in this aspect, the operation evaluation device may evaluate the timings at which predetermined operations are executed. In this case, it would be possible to demand appropriate timings as the timings for execution of the predetermined operations. Due to this, it is possible to guide the predetermined operations to be performed, to more appropriate timings.

In an aspect of the game machine according to the present invention, there may be further provided; an audio output device (6, 11) configured to reproduce and output music for the game; a musical piece data storage device (16) configured to store musical piece data for reproducing a piece of music; and a piece of music reproduction device (15) configured to reproduce the piece of music from the audio output device on the basis of the musical piece data, and wherein timings during the piece of music is utilized as the operational timings. In this case, it is possible to provide a music game that is capable of expanding the range of playing actions that are demanded from the player.

Any type of apparatus may also be used as the input apparatus. For example, in an aspect of the present invention in which a music game is supplied, in the input apparatus, a plurality of operation units may be provided as the operation unit, and each of the operation units may have a shape formed as a drum which is a percussion musical instrument. Moreover, in this aspect, a striking operation upon each of the operation units may be employed as the predetermined operation, and a vibration sensor (20) configured to detect vibration of the operation units when the operation units are struck may be provided to the input apparatus as the operation detection device.

Any kind of devices may be used as the state detection device. For example, an aspect of the game machine according to the present invention, an optical sensor (OS) detecting an action of the player may be used as the state detection device.

As an aspect of the present invention, it is possible to understand a control method of controlling a computer (15) which is incorporated into a game machine comprising an input apparatus (3) that includes at least an operation unit (8), providing a game that demands a predetermined operation on the operation unit from a player, and comprising; an operation detection device (20) configured to detect the predetermined operation upon the operation unit; a state detection device (OS) configured to detect the state of the player who is playing the game, and wherein the control method comprises; an operation evaluation step that evaluates the predetermined operation by the player on the basis of the result of detection by the operation detection device; and a state evaluation step that evaluates the state of the player that is correlated with the predetermined operation, on the basis of the result of detection by the state detection device.

As an aspect of the present invention, it is possible to understand a non-transitory computer readable storage medium storing a computer program for a game machine comprising an input apparatus (3) that includes at least an operation unit (8), and providing a game that demands a predetermined operation on the operation unit from a player, and comprising: an operation detection device (20) configured to detect the predetermined operation upon the operation unit; a state detection device (OS) configured to detect the state of the player who is playing the game, and wherein the computer program for the game machine is configured so as to cause a computer (15) which is incorporated into the game machine, to function as; an operation evaluation device configured to evaluate the predetermined operation by the player on the basis of the result of detection by the operation detection device; and a state evaluation device configured to evaluate the state of the player that is correlated with the predetermined operation, on the basis of the result of detection by the state detection device.

It is possible to actualize a game machine according to an aspect of the present invention by executing the control method and the computer program which is stored in the non-transitory computer readable storage medium of the present invention according to an aspect of the present invention.

What is claimed is:

1. A game machine comprising an input apparatus that includes a plurality of operation units, and providing a game that demands a predetermined operation on the operation units from a player, and the game machine comprises:
   an operation detection device configured to detect the predetermined operation upon the operation units as at least one striking action upon the operation units, wherein the input apparatus comprises the operation detection device, and wherein the operation detection device further includes a vibration sensor configured to detect vibration of the operation units;
   a state detection device configured to detect the state of the player who is playing the game; and
   a control unit configured to operate as:
      an operation evaluation device configured to evaluate the predetermined operation by the player on the basis of the result of detection by the operation detection device;
      a state evaluation device configured to evaluate the state of the player that is correlated with the predetermined operation, with execution of the predetermined operation, on the basis of the result of detection by the state detection device; and an evaluation determination device adapted and configured to determine an evaluation for the predetermined operation by the player on the basis of the results of evaluation by the operation evaluation device and by the state evaluation device so that the evaluation results of the state evaluation is reflected, and wherein the state evaluation device evaluates a state corresponding to a preparatory action for executing the predetermined operation, that is performed with the predetermined operation, as the state of the player that is correlated with the predetermined operation.

2. A game machine according to claim 1, wherein, as the game, there is provided a game which arranges, on the basis of sequence data in which operational timings are specified at which predetermined operations are to be performed, command marks that correspond to the operational timings and a reference mark that corresponds to the present time point along a predetermined path in time order, and which teaches the operational timings to the player by creating relative displacement along the predetermined path between the command marks and the reference mark according to the progression of time so that the command marks agrees with the reference mark at the operational timings corresponding to the command marks.

3. A game machine according to claim 2, wherein the operation evaluation device evaluates the timings at which predetermined operations are executed.

4. A game machine according to claim 2, further comprising;
an audio output device configured to reproduce and output music for the game;
a musical piece data storage device configured to store musical piece data for reproducing a piece of music; and
a piece of music reproduction device configured to reproduce the piece of music from the audio output device on the basis of the musical piece data, and wherein timings during the piece of music is utilized as the operational timings.

5. A game machine according to claim 4, wherein each of the operation units have a shape formed as a drum which is a percussion musical instrument.

6. A game machine according to claim 1, wherein an optical sensor detecting an action of the player is used as the state detection device.

7. A control method of controlling a computer which is incorporated into a game machine comprising an input apparatus that includes a plurality of operation units, providing a game that demands a predetermined operation on the operation units from a player, and comprising: an operation detection device configured to detect the predetermined operation upon the operation units as at least one striking action upon the operation units, wherein the input apparatus comprises the operation detection device, and wherein the operation detection device further includes a vibration sensor configured to detect vibration of the operation units; a state detection device configured to detect the state of the player who is playing the game, and wherein the control method comprises:

an operation evaluation step that evaluates the predetermined operation by the player on the basis of the result of detection by the operation detection device;

a state evaluation step that evaluates the state of the player that is correlated with the predetermined operation, with execution of the predetermined operation, on the basis of the result of detection by the state detection device; and an evaluation determination step that determines an evaluation for the predetermined operation by the player on the basis of the results of evaluation by the operation evaluation step and by the state evaluation step so that the evaluation results of the state evaluation are reflected, and wherein the state evaluation step evaluates a state corresponding to a preparatory action for executing the predetermined operation, that is performed with the predetermined operation, as the state of the player that is correlated with the predetermined operation.

8. A non-transitory computer readable storage medium storing a computer program for a game machine comprising an input apparatus that includes a plurality of operation units, and providing a game that demands a predetermined operation on the operation units from a player, and comprising: an operation detection device configured to detect the predetermined operation upon the operation units as at least one striking action upon the operation units, wherein the input apparatus comprises the operation detection device, and wherein the operation detection device further includes a vibration sensor configured to detect vibration of the operation units; a state detection device configured to detect the state of the player who is playing the game, and wherein the computer program for the game machine is configured so as to cause a computer which is incorporated into the game machine, to function as:

an operation evaluation device configured to evaluate the predetermined operation by the player on the basis of the result of detection by the operation detection device;

a state evaluation device configured to evaluate the state of the player that is correlated with the predetermined operation, with execution of the predetermined operation, on the basis of the result of detection by the state detection device; and an evaluation determination device adapted and configured to determine an evaluation for the predetermined operation by the player on the basis of the results of evaluation by the operation evaluation device and by the state evaluation device so that the evaluation results of the state evaluation is reflected, and wherein the state evaluation device evaluates a state corresponding to a preparatory action for executing the predetermined operation, that is performed with the predetermined operation, as the state of the player that is correlated with the predetermined operation.

* * * * *